United States Patent
Elenes et al.

(10) Patent No.: US 9,118,533 B2
(45) Date of Patent: Aug. 25, 2015

(54) ANTENNA DIVERSITY COMBINING FOR DIFFERENTIALLY MODULATED ORTHOGONAL FREQUENCY DIVISION MULTIPLEXED (OFDM) SIGNALS

(71) Applicant: Silicon Laboratories Inc., Austin, TX (US)

(72) Inventors: Javier Elenes, Austin, TX (US); Dana Taipale, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 14/015,238

(22) Filed: Aug. 30, 2013

(65) Prior Publication Data

US 2015/0063497 A1    Mar. 5, 2015

(51) Int. Cl.
*H04L 27/26* (2006.01)
*H04B 1/12* (2006.01)
*H04B 7/08* (2006.01)

(52) U.S. Cl.
CPC ............ *H04L 27/2649* (2013.01); *H04B 1/126* (2013.01); *H04B 7/0891* (2013.01); *H04L 27/265* (2013.01)

(58) Field of Classification Search
CPC .. H04B 1/126; H04B 1/71075; H04B 1/7115; H04B 7/04; H04B 7/0404; H04B 7/0408; H04B 7/0413; H04B 7/0452; H04B 7/0491; H04B 7/0891; H04B 2201/70727; H04B 2201/709727; H04B 2201/71632; H04L 27/265; H04L 27/2671; H04L 27/2672; H04L 2025/03401; H04L 2025/03414; H04L 2025/03426; H04L 2025/03445; H04L 2025/03522; H04L 27/2649

USPC ......... 375/144, 148, 260–262, 264–267, 349, 375/350; 370/208, 210, 328
See application file for complete search history.

(56) References Cited

U.S. PATENT DOCUMENTS

| | | | |
|---|---|---|---|
| 5,838,742 A | | 11/1998 | Abu-Dayya |
| 6,069,912 A | | 5/2000 | Sawahashi et al. |
| 6,151,372 A | | 11/2000 | Yamamoto |
| 6,236,844 B1 | | 5/2001 | Cvetkovic et al. |
| 6,393,083 B1 | | 5/2002 | Beukema |
| 6,654,340 B1 | * | 11/2003 | Jones et al. ................... 370/208 |
| 6,760,386 B2 | | 7/2004 | Li et al. |
| 7,555,065 B1 | | 6/2009 | Lou et al. |
| 8,155,610 B2 | | 4/2012 | Elenes et al. |

(Continued)

FOREIGN PATENT DOCUMENTS

EP     0716513 A1   12/1996
JP     2005269026   9/2005

OTHER PUBLICATIONS

U.S. Appl. No. 14/061,084, entitled "Synchronizing Orthogonal Frequency Division Multiplexed (OFDM) Symbols in a Receiver", filed Oct. 23, 2013, by Javier Elenes, et al.

*Primary Examiner* — Young T Tse
(74) *Attorney, Agent, or Firm* — Trop, Pruner & Hu, P.C.

(57) ABSTRACT

In an embodiment, an apparatus includes a first tuner to receive a radio frequency (RF) signal from a first antenna and to process the RF signal to generate a first time-domain quadrature signal, a second tuner to receive the RF signal from a second antenna and to process the RF signal to generate a second time-domain quadrature signal, and a combiner circuit to receive the first and second time-domain quadrature signals.

17 Claims, 6 Drawing Sheets

(56) References Cited

U.S. PATENT DOCUMENTS

| | | |
|---|---|---|
| 8,351,534 B2 | 1/2013 | Mussmann et al. |
| 8,781,421 B2 | 7/2014 | Elenes et al. |
| 2002/0045432 A1 | 4/2002 | Yoshida |
| 2002/0061051 A1 | 5/2002 | Kitahara |
| 2002/0131536 A1 | 9/2002 | Veillette |
| 2002/0172270 A1 | 11/2002 | Whikehart et al. |
| 2006/0031276 A1* | 2/2006 | Kumamoto et al. .......... 708/403 |
| 2007/0036249 A1 | 2/2007 | Shatara et al. |
| 2008/0025446 A1* | 1/2008 | Van Wechel et al. ......... 375/350 |
| 2008/0031369 A1 | 2/2008 | Li et al. |
| 2008/0291857 A1 | 11/2008 | Arad et al. |
| 2008/0298515 A1 | 12/2008 | Peyla et al. |
| 2009/0103644 A1* | 4/2009 | Nakao ........................... 375/260 |
| 2009/0298453 A1 | 12/2009 | Elenes et al. |
| 2010/0135377 A1* | 6/2010 | Li et al. ......................... 375/232 |
| 2010/0159837 A1 | 6/2010 | Dent et al. |
| 2010/0165926 A1 | 7/2010 | Fukuoka et al. |
| 2011/0038446 A1 | 2/2011 | Keller |
| 2011/0039492 A1 | 2/2011 | Johnson et al. |
| 2011/0243209 A1 | 10/2011 | Oren et al. |
| 2011/0310948 A1 | 12/2011 | Ramesh et al. |
| 2012/0028567 A1 | 2/2012 | Marko |
| 2012/0321012 A1* | 12/2012 | Elenes et al. .................. 375/285 |
| 2014/0094130 A1* | 4/2014 | Elenes et al. .................. 455/132 |

\* cited by examiner

ANTENNA DIVERSITY COMBINING FOR DIFFERENTIALLY MODULATED ORTHOGONAL FREQUENCY DIVISION MULTIPLEXED (OFDM) SIGNALS

BACKGROUND

Multipath distortion is caused when two or more radio signals modulating the same message signal arrive at a receiver at different times and with different phases and attenuation levels due to reflections of the signal from various objects. The radio signal, prior to arriving at the receiver, can experience changes in amplitude and phase due to two types of multipath fading: flat and frequency-selective. In urban environments, reflections from close-in objects such as buildings result in short delay multi-path fading, causing wideband deep fades. In this scenario all spectral components of the signal experience amplitude attenuation simultaneously (flat fading). In turn, long multipath delay (or frequency selective fading) arises due to reflections from objects several kilometers away such as distant hills and tall buildings. In this case subsets of sub-carriers in the signal are impaired. Multipath impairments on a digital radio signal result in increased bit error rates at the demodulator output and may result in audio distortion and or partial loss of data services.

Antenna diversity is a scheme whereby two or more antennae are used to receive a common signal and the signal is combined to compensate for fading impairments. The fundamental assumption of receiving the same signal on spatially separated antennae and combining the signals is that of uncorrelated fading. That is, while the signal received on one antenna may be faded, little to no fading will occur on the signal received on the other antenna. Moreover, a diversity receiver can produce a signal with higher signal-to-noise ratio (SNR) (up to 3 dB) when no fading is present, resulting in greater audio quality and data services integrity as compared to a single antenna system. Although antenna phase diversity for analog FM broadcast signals is known and implemented in certain vehicle platforms, current architectures do not efficiently handle digital radio broadcasts (for example HD™ radio or Digital Audio Broadcasting (DAB)).

SUMMARY OF THE INVENTION

In one aspect, an apparatus comprises: a first tuner to receive a radio frequency (RF) signal from a first antenna and to process the RF signal to generate a first time-domain quadrature signal; a second tuner to receive the RF signal from a second antenna and to process the RF signal to generate a second time-domain quadrature signal; and a combiner circuit to receive the first and second time-domain quadrature signals. As one example, the combiner circuit is integrated in the second tuner, and the first and second tuners are each formed on a single semiconductor die.

In an example, the combiner circuit includes: a first path circuit to convert the first time-domain quadrature signal to a first frequency-domain signal and to differentially decode the first frequency-domain signal; a second path circuit to convert the second time-domain quadrature signal to a second frequency-domain signal and to differentially decode the second frequency-domain signal; and a first combiner to combine the first and second decoded frequency-domain signals into a combined frequency-domain signal.

In one embodiment, the apparatus further includes a re-encoder coupled to the first combiner to generate an estimated signal based on the combined frequency-domain signal. A first filter may be provided to filter the first time-domain quadrature signal based at least in part on the estimated signal, and a second filter provided to filter the second time-domain quadrature signal based at least in part on the estimated signal. And a second combiner combines the filtered first and second time-domain quadrature signals. The apparatus may further include a first multiplier to multiply a conjugate of the first frequency-domain signal with the estimated RF signal to generate a first channel estimate and a second multiplier to multiply a conjugate of the second frequency-domain signal with the estimated signal to generate a second channel estimate. Still further, the apparatus may further include a first conversion engine to convert the first channel estimate from a frequency-domain to a first time-domain estimate and a second conversion engine to convert the second channel estimate from a frequency-domain to a second time-domain estimate.

As one example, a system may further include a third tuner to receive the combined frequency-domain signal, where this tuner includes a third combiner to generate a diversity combined signal via combination of the combined frequency-domain signal with a third frequency-domain signal generated in the third tuner from the RF signal received in the third tuner from a third antenna. The third tuner may further include a de-mapper to de-map the diversity combined signal into a de-mapped frequency-domain signal and to provide the de-mapped frequency-domain signal to a demodulator, where the demodulator does not include a de-mapper. In an example, the third tuner further includes a re-encoder to encode the diversity combined signal and a third conversion engine to convert the encoded diversity combined signal to a diversity time-domain signal. This tuner also may include a cyclic prefix generator to generate a cyclic prefix from the diversity time-domain signal and to append the cyclic prefix to the diversity time-domain signal to generate a differential orthogonal frequency division multiplexed (OFDM) time-domain signal to provide to a demodulator.

In another aspect, a method includes: receiving a RF signal from a first antenna and generating a first time-domain quadrature signal therefrom; receiving the RF signal from a second antenna and generating a second time-domain quadrature signal therefrom; converting the first time-domain quadrature signal to a first frequency-domain signal and converting the second time-domain quadrature signal to a second frequency-domain signal; differentially decoding the first and second frequency-domain signals; combining the decoded first and second-frequency domain signals to obtain an estimated signal; combining the estimated signal with a conjugate of the first frequency-domain signal to obtain a first channel estimate; combining the estimated signal with a conjugate of the second frequency-domain signal to obtain a second channel estimate; filtering the first time-domain quadrature signal using the first channel estimate and filtering the second time-domain quadrature signal using the second channel estimate; and combining the first and second filtered time-domain quadrature signals to generate a diversity time-domain signal.

The method may further include convolving a conjugate of the first frequency-domain signal with the estimated signal to generate a first channel estimate, and convolving a conjugate of the second frequency-domain signal with the estimated signal to generate a second channel estimate. The method further may include converting the first channel estimate to a first time-domain estimate and converting the second channel estimate to a second time-domain estimate.

In yet another aspect, an apparatus includes: a first tuner to receive a RF signal from a first antenna where this first tuner includes a RF front end circuit to condition the RF signal; an analog-to-digital (ADC) converter to convert the conditioned RF signal to a digitized signal; a digital front end circuit to generate a first time-domain quadrature signal from the digitized signal; and a digital signal processor (DSP) coupled to the digital front end circuit.

In one example, the DSP includes a first path circuit to convert the first time-domain quadrature signal to a first frequency-domain signal and to differentially decode the first frequency-domain signal, a second path circuit to convert a second time-domain quadrature signal to a second frequency-domain signal and to differentially decode the second frequency-domain signal, the second time-domain quadrature signal generated by a second tuner from the RF signal received from a second antenna, and a first combiner to combine the first and second decoded frequency-domain signals into a combined frequency-domain signal.

DETAILED DESCRIPTION

In various embodiments, diversity combining may be performed on differentially modulated radio frequency (RF) signals, including orthogonal frequency division multiplexed (OFDM) signals. While such signals can be used in many different communication systems, some examples include digital audio broadcasting (DAB) signals, wireless communication such as according to an IEEE 802.11 standard, long term evolution (LTE) cellular communication systems, among others.

To provide diversity combining while reducing complexity on a downstream demodulator, embodiments may perform the combining of signals from different antennas in tuner circuitry prior to outputting a processed signal to a demodulator or other downstream circuitry. In this way, the complexity of performing diversity combining at baseband can be avoided.

Figure 1:
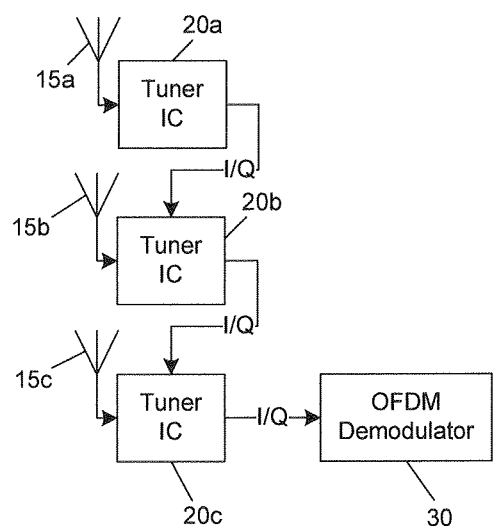
FIG. 1 is a block diagram of a system in accordance with an embodiment.

Referring now to FIG. 1, shown is a block diagram of a system in accordance with an embodiment. As shown in FIG. 1, system 10 is a multi-tuner system including a plurality of tuners 20a-20c. Each of these tuners is coupled to a different antenna 15a-15c. By using information from multiple antennas and tuners, diversity combining can improve performance, particularly in situations where one or more of the antennas suffer from impairments due to a variety of conditions. In the arrangement of FIG. 1, tuners 20 may be connected in a serial manner. In an embodiment, each tuner may be of a separate integrated circuit (IC), although in some implementations multiple tuners may be present in a single IC, such as one or more tuners on a single semiconductor die, e.g., of a CMOS process.

In operation, tuner 20a sends its channelized output, which in an embodiment may be a channelized quadrature (I/Q) signal of a lower frequency than the received RF signal. This lower frequency signal may be an intermediate frequency (IF) or a low-IF signal, as examples. In second tuner 20b, a combining operation is performed to combine the received quadrature signal from tuner 20a with a corresponding quadrature signal generated in tuner 20b. In turn, this combined signal is sent to third tuner 20c to combine the combined signal from tuner 20b with a channelized quadrature signal generated in tuner 20c. This results in a multiple-antenna combined signal or drive circuitry combined signal (e.g., a 3-tuner combined signal) in the example of FIG. 1. This resulting diversity combined signal is then provided to a downstream demodulator 30, which in an embodiment is a conventional OFDM demodulator. Note that additional tuners (or only two tuners) can be aggregated to produce an N-antenna time-domain combined signal suitable for demodulation by demodulator 30. Although shown at this high level in the embodiment of FIG. 1, understand that various algorithms for combining the I/Q signals from the different tuners can be used in different implementations.

Thus in contrast to a conventional receiver that uses diversity combining, demodulator-based combining is avoided. That is, in a conventional diversity combining system, multiple tuners provide time-domain antenna signals to a diversity demodulator that combines the signals at baseband. In turn, this diversity demodulator synchronizes in time and frequency to these signals, and performs additional processing to combine the signals in the frequency-domain. These frequency-domain signals are then mapped into symbols and decoded within the demodulator. Yet using such a conventional diversity combining demodulator raises complexity as the baseband complexity scales linearly with the number of tuners present in the system. In practice, a diversity demodulator typically handles no more than two antenna signals due to the complexity involved in scaling the demodulator. In contrast, embodiments here combine multiple antenna signals within the tuner itself and enable an N-antenna diversity system using N tuners and a single non-diversity demodulator.

Embodiments may use different combining algorithms applicable to differentially modulated OFDM signals. These algorithms can estimate and remove a fractional frequency offset from the OFDM signal and synchronize a fast Fourier transform (FFT) window to an OFDM symbol. A synchronization circuit estimates frequency and timing offsets by means of cyclic-prefix correlation, in an embodiment. A peak correlation index indicates timing offset and the complex angle of the peak value indicates frequency offset. Synchronization can be made more robust by adding the correlation value from multiple antennas, in some embodiments.

Figure 2:
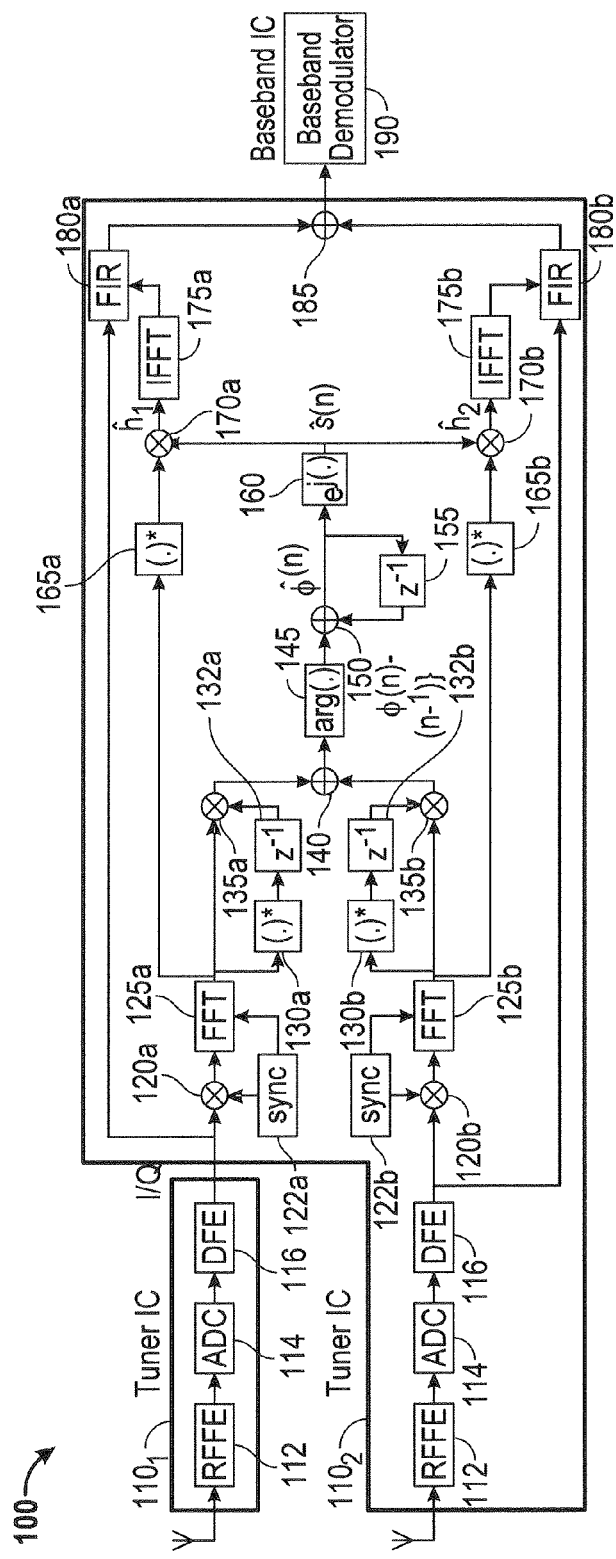
FIG. 2 is a block diagram of a diversity combining arrangement in accordance with an embodiment.

Referring now to FIG. 2, shown is a block diagram of a diversity combining arrangement in accordance with an embodiment. As seen in FIG. 2, system 100 includes multiple tuners, namely tuners $110_1$ and $110_2$ (generally tuner 110). Understand that additional tuners may be present in other embodiments. In the illustration shown, each tuner 110 may be a separate IC including an RF front end circuit 112, an analog-to-digital converter (ADC) 114, and a digital front end circuit 116 to thus generate an I/Q signal. In general, RF front end circuit 112 downconverts the RF signal to a lower frequency and may perform filtering, gain operations and so forth. ADC 114 digitizes the downconverted signal, and digital front end circuit 116 channelizes the signal to generate the quadrature signal. In an implementation, differently configured tuners may be provided in a system, with some tuners including relatively limited circuitry as in tuner $110_1$ and other tuners such as tuner $110_2$ providing additional circuitry to handle the diversity combining. In other implementations, the multiple tuners all may be identical tuners; however, they may be differently configured, e.g., based on configuration information, switches or other logic to enable one or more of the tuners to output quadrature signals while one or more other tuners perform the diversity combining described herein.

For purposes of explanation, processing of the I/Q signal from tuner $110_1$ in a first signal path is discussed: understand that similar processing occurs in a second signal path for the I/Q signal from tuner $110_2$. In general tuner $110_2$ includes digital circuitry such as a digital signal processor (DSP) or other digital controller to perform the diversity combining described here. As seen, the incoming I/Q signal is provided to a mixer $120a$ where it is downconverted to baseband, e.g., via a control signal provided by a synchronization unit $122a$ that further enables removal of fractional frequency offsets from the OFDM signal and synchronizes a FFT window to the OFDM symbol. The resulting downconverted signal is provided to an FFT engine $125a$ that converts the received time-domain signal to a frequency-domain signal formed of a plurality of sub-carriers. Next, these sub-carriers are differentially decoded using a decoder formed of a complex conjugate operator $130a$ and a delay element $132a$. This delayed signal is then multiplied in a multiplier $135a$ with the sub-carrier to generate the differentially decoded sub-carrier. Similar operations occur in a second signal path for the quadrature signal generated from the second antenna signal.

The differentially decoded sub-carriers from the two signal paths are combined in a combiner $140$. A phase angle of this combined signal is determined in a phase engine $145$ and is provided to an adder $150$, which sums the received signal with an output of a delay element $155$ which performs differential re-encoding by integrating the phase from symbol-to-symbol. The resulting phase-encoded signal is provided to an exponential generator $160$ to generate a complex corresponding to the estimated signal for each sub-carrier. This estimated signal $\hat{s}$ (n) is provided to a multiplier $170a$ where this estimated signal is multiplied with an output of a complex conjugate operator $165a$ which generates a complex conjugate from the output of FFT engine $125a$.

Multiplier $170a$ thus generates a channel estimate $\hat{h}_1$ which is provided to an inverse FFT (IFFT) engine $175a$. Filter $180$ filters the I/Q signal received from the tuner based on an output of an IFFT engine $175a$ which provides time-domain complex taps by computing the center bins of the IFFT of channel estimate $\hat{h}_1$. In an embodiment, the number of center bins K may be much smaller than the number of bins of the N-point FFT. The resulting output of co-phasing filter $180a$ is combined with the output of a corresponding co-phasing filter $180b$ in a combiner $185$ to generate a diversity combined signal for output to a baseband demodulator $190$. As such, this demodulator thus avoids the need to perform diversity combining.

System $100$ may thus perform diversity combining using blind channel estimation. Tuner $110_2$ adds the signals in the time domain after convolving each antenna signal with a co-phasing complex vector. A vector is computed on an OFDM symbol-by-symbol basis by computing the K<<N center bins of the N-point IFFT of the conjugate channel response of each antenna.

The channel response for each antenna is estimated as follows. First, OFDM sub-carriers are recovered by taking the FFT of the time-domain signal from each antenna in FFT engine $125$. Next the subcarriers are differentially decoded. Differentially decoded sub-carriers are added across antennas in combiner $140$. Next the transmitted signal s(n) on each sub-carrier is estimated by taking the complex angle (differential sub-carrier phase) in phase engine $145$, applying differential re-encoding by integrating the phase from symbol-to-symbol in integrator $155$, and taking the complex exponential in exponential generator $160$. The phase integrator can be initialized with an a priori known signal phase at a predetermined time. For example in the DAB system the integrator is initialized at the beginning of the DAB using the a priori known Time-Frequency-Phase-Reference (TFPR) symbol phases. The estimated signal $\hat{s}$ (n) is then multiplied with the conjugate of the differentially encoded signal from each antenna to produce conjugate channel estimates $\hat{h}_1$ and $\hat{h}_2$. But in another embodiment, the signals may be combined in the frequency-domain by multiplying each frequency-domain with the conjugate channel response and then re-encoding and converting back to the time-domain.

Figure 3:
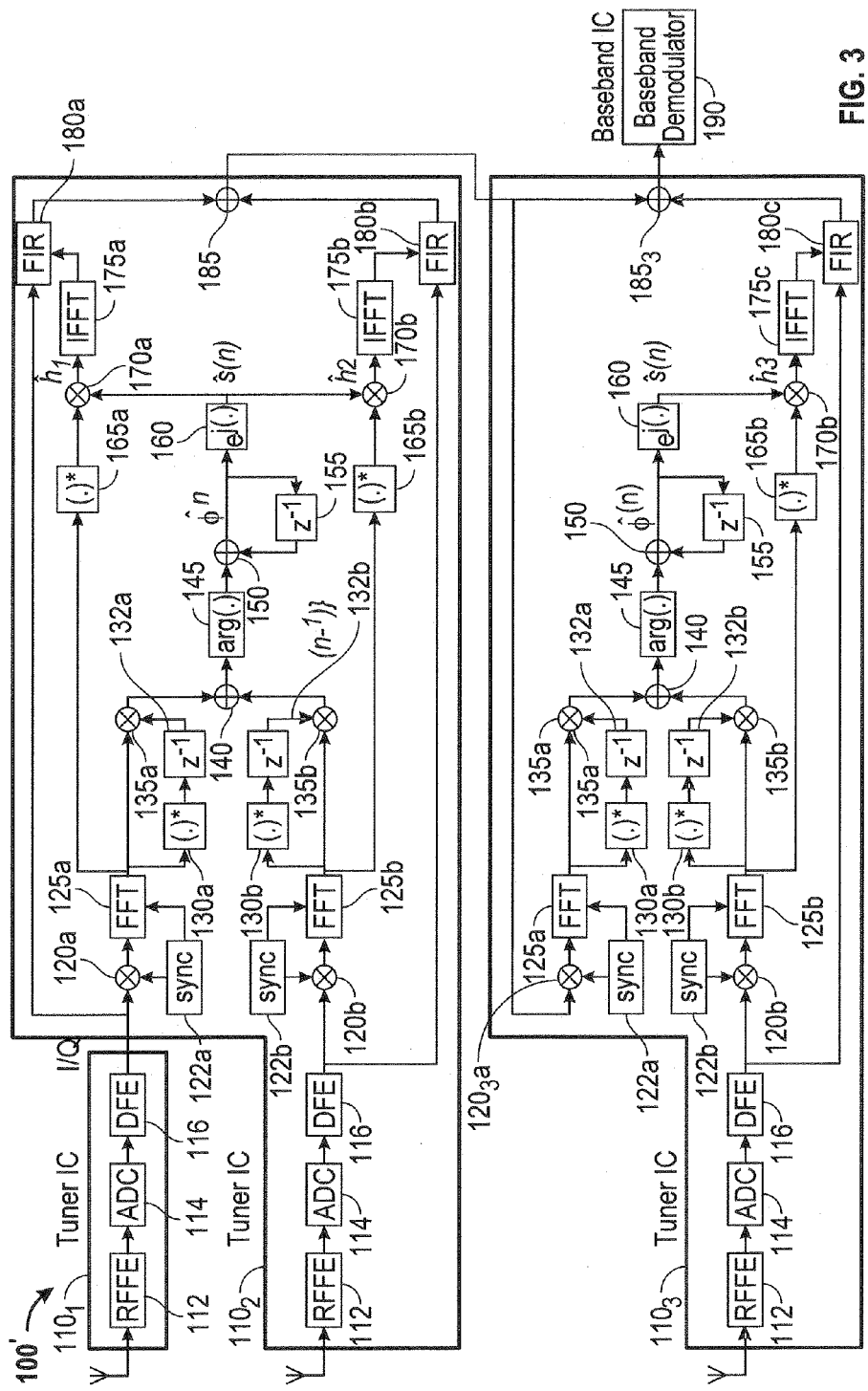
FIG. 3 is a block diagram of a diversity combining system in accordance with another embodiment.

Referring now to FIG. 3, shown is a block diagram of a diversity combiner in accordance with another embodiment, more particularly a three tuner system. As shown in FIG. 3, system $100'$ includes first and second tuners $110_1$ and $110_2$ configured the same as tuner $100$ of FIG. 2. However here note that the diversity combined signal output by combiner $185$ of tuner $110_2$ is in turn provided to a final combiner $185_3$ of a third tuner $110_3$. In general, tuner $110_3$ is configured the same as tuner $110_2$. However, instead of receiving a single antenna signal from another tuner, it receives this diversity combined signal, which in addition to being provided to combiner $185_3$ is also provided to a mixer $120_{3a}$. In other aspects tuner $110_3$ is configured to operate to perform the diversity combining as above described in FIG. 2. The fully diversity combined signal output by combiner $185_3$ in turn is provided to a single non-diversity baseband demodulator $190$, thus enabling a three-antenna/tuner system to operate using a single demodulator.

Thus the combined time-domain signal from tuner $110_2$ is passed to tuner $110_3$. Tuner $110_3$ performs joint synchronization by adding the cyclic-prefix correlation from the tuner $110_2$ signal to the cyclic-prefix correlation of its own antenna signal. The index and angle of the correlation peak are used to determine frequency and timing offsets as described. The channel for the third antenna is estimated and its truncated IFFT output (center K<<N bins of the N-point IFFT) is convolved with the third antenna time-domain signal. The convolution output is added with tuner $110_2$ signal to form a combined 3-antenna time-domain signal. The system can be scaled up in this fashion to N-antennas, with the resulting N-antenna time-domain signal being provided to a conventional OFDM demodulator.

Figure 4:
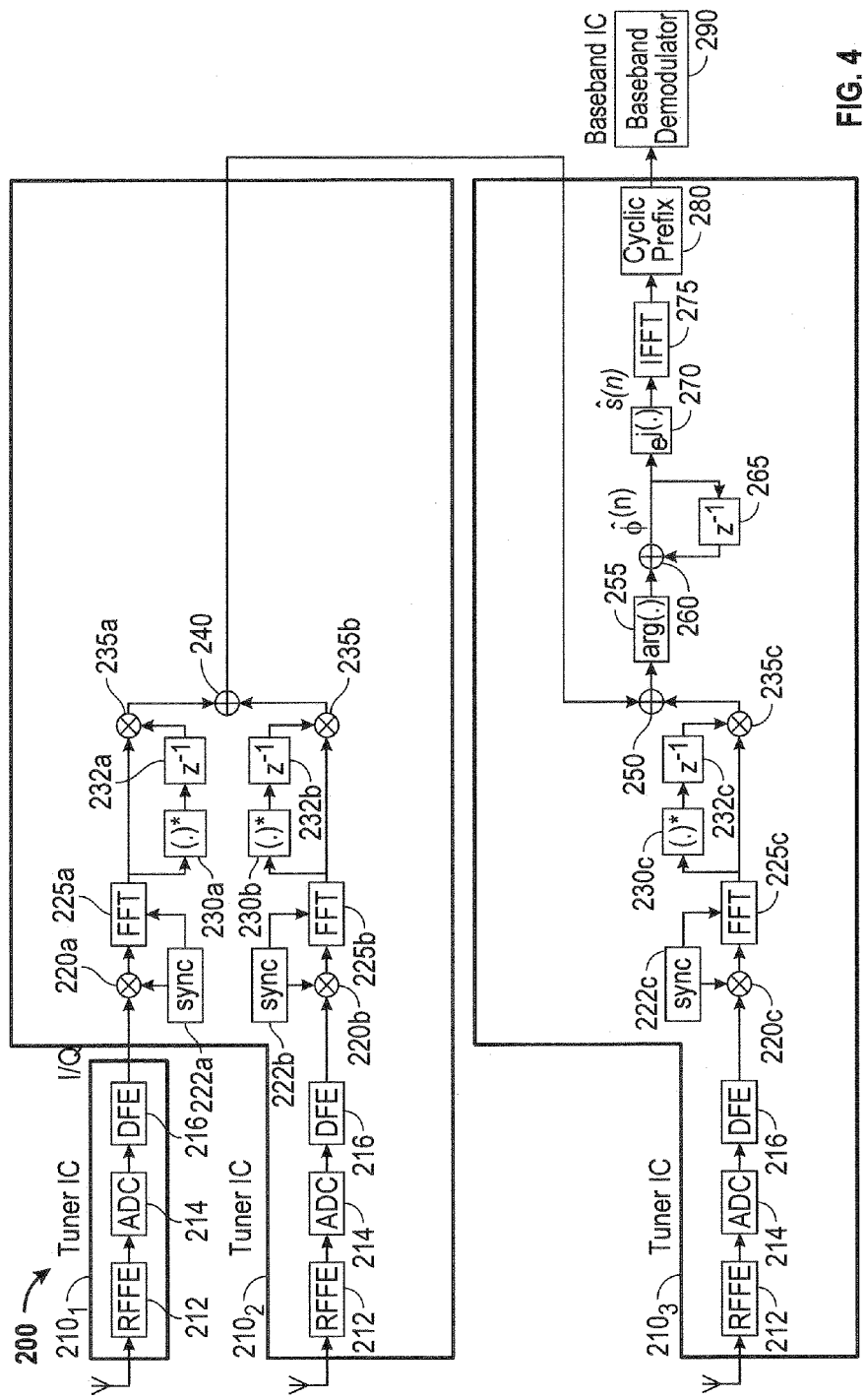
FIG. 4 is a block diagram of a diversity combining system in accordance with yet another embodiment.

Referring now to FIG. 4, shown is a block diagram of a diversity combiner in accordance with another embodiment. As seen in FIG. 4, system $200$ may be similarly adapted as system $100$ of FIG. 2, namely a multi-tuner arrangement that provides for diversity combining to generate a diversity combined signal at baseband that is output to a baseband demodulator $290$. As seen, three tuners $210_1$-$210_3$ are present. However in this implementation, certain complexity is avoided, as second tuner $210_2$ provides a frequency-domain signal to third tuner $210_3$ for combining with the differentially decoded sub-carriers obtained in tuner $210_3$ to generate a combined signal, which is provided to a baseband demodulator $290$.

Each tuner includes an RF front end unit $212$, an ADC $214$, and a digital front end unit $216$ to provide quadrature signals to downstream circuitry. As with the above cases, tuner $210_1$ provides its quadrature signals to a mixer $220_a$ which downconverts the signal under control of a synchronization unit $222_a$. The downconverted signals are converted to the frequency-domain in an FFT engine $225_a$. Differential decoding is performed using complex conjugate operator $230_a$ and a delay element 232$_a$, where the resulting signal multiplied in multiplier 235$_a$. Similar processing occurs for the quadrature signal processed in tuner 210$_2$, and the resulting signals are combined in combiner 240.

Similar differential decoding is performed on the quadrature signal in tuner 210$_3$ with the resulting signal combined with the combined signal output from tuner 210$_2$ in a combiner 250. A phase of this this signal is then determined in phase engine 255, and re-encoding is performed with a combiner 260 and an integrator 265. The resulting re-encoded signal is input into an exponential generator 270 and the resulting estimated signal ŝ (n) is converted to the time domain in an IFFT engine 275.

Note that in the implementation of FIG. 4, the time-domain signal output by IFFT engine 275 is provided to a cyclic prefix engine 280 which appends a cyclic prefix to the time-domain signal, resulting in a time-domain OFDM signal provided to baseband demodulator 290.

Note that this implementation does not rely on channel estimation. Here, first tuner 210$_1$ sends channelized time-domain I/Q to second tuner 210$_2$. The second tuner takes FFTs on the two antenna signals, differentially decodes each sub-carrier and adds the differentially decoded sub-carriers from the two antennas. The sum (now a frequency-domain signal) is passed to third tuner 210$_3$. The third tuner differentially decodes its FFT output and adds it to the input from tuner 210$_2$. The last tuner in the chain takes the complex angle of the sum of differentially decoded sub-carriers to obtain an estimate of the transmitted sub-carrier differential phase, and re-encodes by integrating the differential phase from symbol-to-symbol in integrator 265. The integrated phase is applied to a complex exponential function 270 to obtain an estimate of the transmitted sub-carrier signals. The integrator can be initialized with a priori known signal phase at a determined time. For example in the DAB system the integrator is initialized at the beginning of the DAB frame using the a priori known TFPR symbol phases. An IFFT is taken of the estimated sub-carriers in IFFT engine 275 and a cyclic prefix is added via prefix generator 280, forming a time-domain OFDM signal which is provided to a conventional OFDM demodulator. As another embodiment, each tuner's differentially decoded sum can be re-encoded into the time-domain and a time-domain signal is communicated to the next tuner.

In yet other embodiments, the re-encoding and IFFT operations can be omitted from the last tuner. In these cases, the sum of the differentially decoded symbols is scaled and quantized into soft symbols by a soft symbol demapper, and the resulting soft symbols are passed to a simplified demodulator. Since the tuner is performing synchronization, FFT, and soft symbol de-mapping, these operations can be removed from the demodulator. The simplified demodulator performs de-interleaving and forward error correction (FEC) decoding to produce decoded bits.

Figure 5:
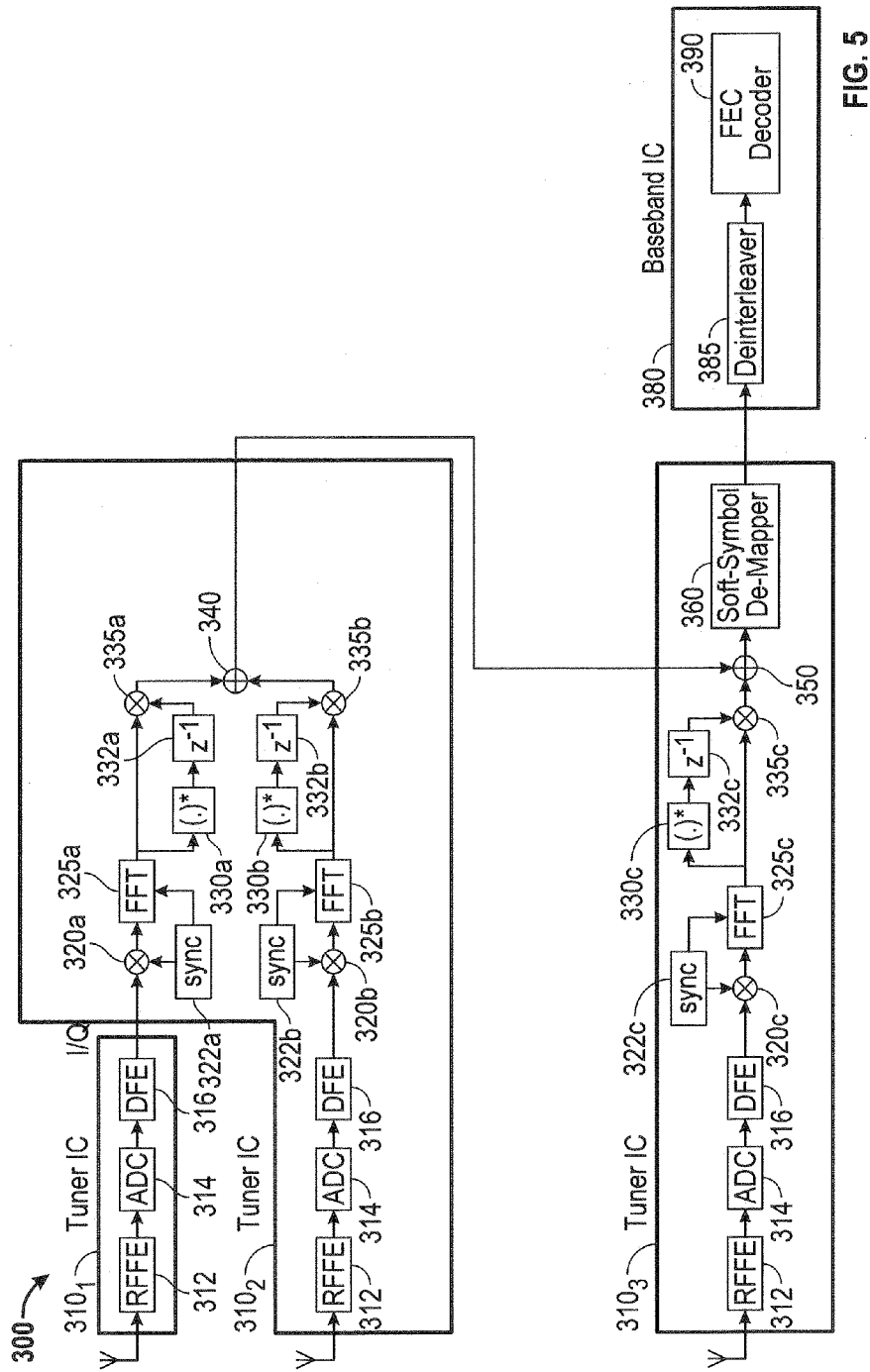
FIG. 5 is a block diagram of a diversity combining system in accordance with a still further embodiment.

A block diagram for a 3-antenna system is shown in FIG. 5, which is a diversity combiner in accordance with yet another embodiment to provide a frequency-domain output. As seen in FIG. 5, system 300 is a 3-tuner system including tuners 310$_1$-310$_3$. In general, tuners 310$_1$ and 310$_2$ are configured similarly to tuners 210$_1$ and 210$_2$ of FIG. 4. Also, the front end portion of tuner 310$_3$ is configured similarly to that of tuner 210$_3$ of FIG. 4. However, the 3-antenna combined signal output by combiner 350 is instead provided to a demapper 360 which performs soft symbol demapping to thus scale and quantize the differentially decoded symbol into a soft symbol for transmission to a demodulator 380. Note that because frequency-domain signals are provided to demodulator 380, less complexity is involved. In the implementation shown, demodulator 380 includes a de-interleaver 385 and a FEC decoder 390 to process the incoming soft symbol to generate decoded bits.

Figure 6:
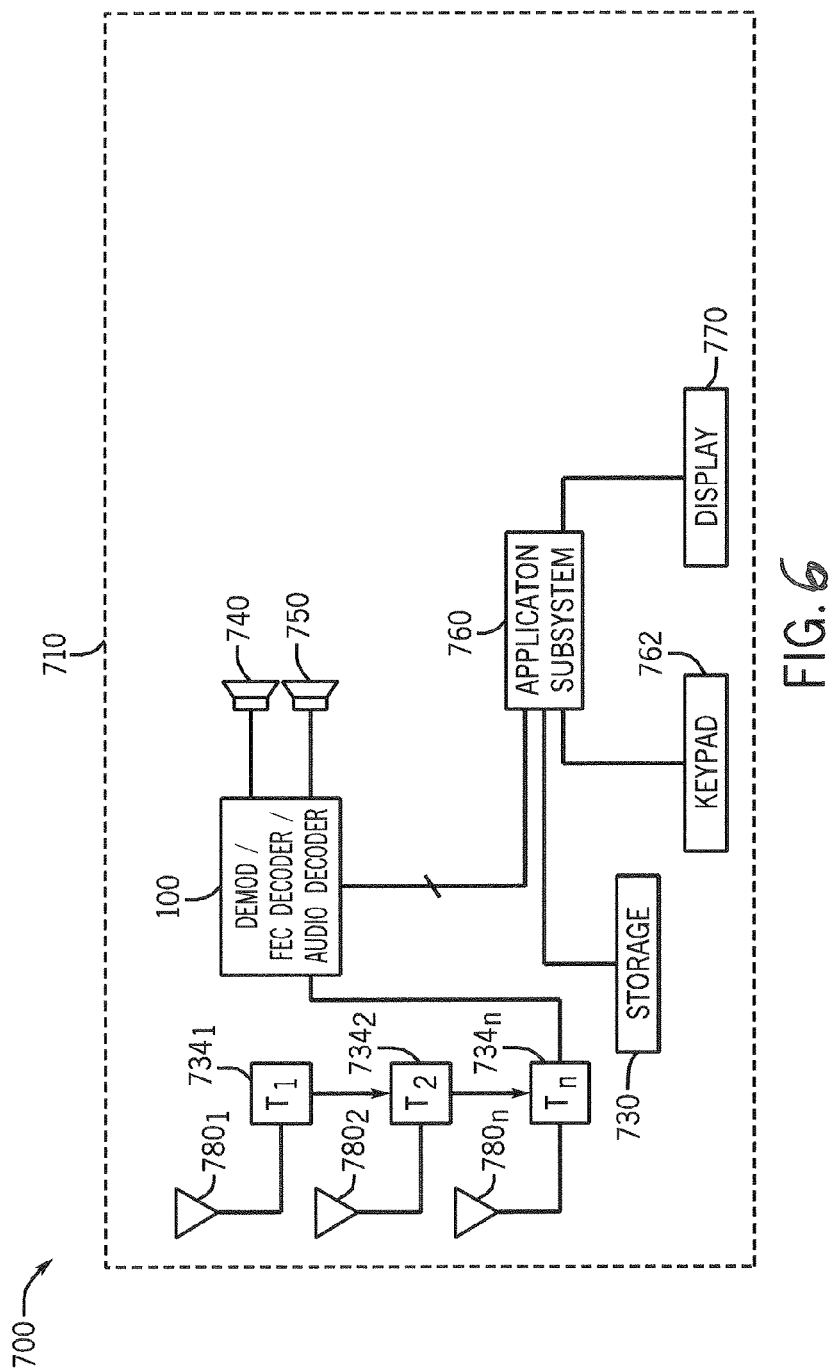
FIG. 6 is a block diagram of a system in accordance with an embodiment of the present invention.

Referring to FIG. 6, in accordance with some embodiments of the invention, an antenna diversity combining technique can be part of a multimedia portable wireless device 710, which in turn is part of a wireless system 700. As examples, the wireless device 710 may be a multi-function, multi-band radio, cellular telephone, smart phone, PDA, tablet computer, mobile game device, or so forth and may play music or book downloads, and may be part of a wireless link between a satellite antenna and a radio receiver, a terrestrial receiver, etc. In one of the embodiments, the wireless device may be a mobile radio receiver such as of a car stereo.

Among its other various functions, the wireless device 710 may store digital content on a storage 730, which may be a flash memory or hard disk drive, as a few examples. The wireless device 710 generally includes an application subsystem 760 that may, for example, receive input from a keypad 762 of the wireless device 710 (which may be a touch pad, e.g., of a display 770) and display information on display 770. Furthermore, the application subsystem 760 may generally control the retrieval and storage of content from the storage 730. As further seen in FIG. 6, multiple antennas 780$_1$-780$_n$ each may be coupled to a corresponding tuner 734$_1$-734$_n$, which can be coupled together such that the last tuner outputs a combined frequency domain symbol to a demodulator/FEC decoder/audio decoder 100, which may be directly connected to speakers 740 and 750 for output of audio data (understand that in some embodiments a separate audio processor may be integrated between the receiver and speakers).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a first tuner configured to receive a radio frequency (RF) signal from a first antenna and to process the RF signal to generate a first time-domain quadrature signal;
    a second tuner configured to receive the RF signal from a second antenna and to process the RF signal to generate a second time-domain quadrature signal;
    a combiner circuit configured to receive the first and second time-domain quadrature signals, the combiner circuit including:
        a first path circuit configured to convert the first time-domain quadrature signal to a first frequency-domain signal and to differentially decode the first frequency-domain signal;
        a second path circuit configured to convert the second time-domain quadrature signal to a second frequency-domain signal and to differentially decode the second frequency-domain signal; and
        a first combiner configured to combine the first and second decoded frequency-domain signals into a combined frequency-domain signal;
    a re-encoder coupled to the first combiner to generate an estimated signal based on the combined frequency-domain signal;
    a first filter configured to filter the first time-domain quadrature signal based at least in part on the estimated signal;

a second filter configured to filter the second time-domain quadrature signal based at least in part on the estimated signal; and
a second combiner configured to combine the filtered first and second time-domain quadrature signals.

2. The apparatus of claim 1, wherein the re-encoder comprises a phase integrator configured to integrate a phase between consecutive symbols.

3. The apparatus of claim 2, further comprising a controller configured to initialize the phase integrator using a phase of a Time-Frequency-Phase-Reference (TFPR) symbol.

4. The apparatus of claim 1, further comprising:
a first multiplier configured to multiply a conjugate of the first frequency-domain signal with the estimated signal to generate a first channel estimate; and
a second multiplier configured to multiply a conjugate of the second frequency-domain signal with the estimated signal to generate a second channel estimate.

5. The apparatus of claim 4, further comprising:
a first conversion engine configured to convert the first channel estimate from a frequency-domain to a first time-domain estimate; and
a second conversion engine configured to convert the second channel estimate from a frequency-domain to a second time-domain estimate.

6. The apparatus of claim 5, wherein the first filter comprises at least one tap configured with the first time-domain estimate, and the second filter comprises at least one tap configured with the second time-domain estimate.

7. The apparatus of claim 1, further comprising a third tuner configured to receive the combined frequency-domain signal and including a third combiner configured to generate a diversity combined signal via combination of the combined frequency-domain signal with a third frequency-domain signal generated in the third tuner from the RF signal received in the third tuner from a third antenna.

8. The apparatus of claim 7, wherein the third tuner further comprises a de-mapper configured to de-map the diversity combined signal into a de-mapped frequency-domain signal and to provide the de-mapped frequency-domain signal to a demodulator, the demodulator not including a de-mapper.

9. The apparatus of claim 7, wherein the third tuner further includes:
a second re-encoder configured to encode the diversity combined signal; and
a conversion engine to convert the encoded diversity combined signal to a diversity time-domain signal.

10. The apparatus of claim 9, further comprising a cyclic prefix generator configured to generate a cyclic prefix from the diversity time-domain signal and to append the cyclic prefix to the diversity time-domain signal to generate a differential orthogonal frequency division multiplexed (OFDM) time-domain signal to a demodulator.

11. The apparatus of claim 1, wherein the combiner circuit is integrated in the second tuner, the first tuner and the second tuner each formed on a single semiconductor die.

12. A method comprising:
receiving a radio frequency (RF) signal from a first antenna and generating a first time-domain quadrature signal therefrom;
receiving the RF signal from a second antenna and generating a second time-domain quadrature signal therefrom;
converting the first time-domain quadrature signal to a first frequency-domain signal and converting the second time-domain quadrature signal to a second frequency-domain signal;
differentially decoding the first frequency-domain signal and differentially decoding the second frequency-domain signal;
combining the decoded first frequency-domain signal and the decoded second-frequency domain signal to obtain an estimated signal;
combining the estimated signal with a conjugate of the first frequency-domain signal to obtain a first channel estimate;
combining the estimated signal with a conjugate of the second frequency-domain signal to obtain a second channel estimate;
filtering the first time-domain quadrature signal using the first channel estimate and filtering the second time-domain quadrature signal using the second channel estimate; and
combining the first and second filtered time-domain quadrature signals to generate a diversity time-domain signal.

13. The method of claim 12, further comprising:
convolving the conjugate of the first frequency-domain signal with the estimated signal to generate the first channel estimate; and
convolving the conjugate of the second frequency-domain signal with the estimated signal to generate the second channel estimate.

14. The method of claim 13, further comprising:
converting the first channel estimate to a first time-domain estimate; and
converting the second channel estimate to a second time-domain estimate.

15. The method of claim 14, further comprising configuring at least one tap of a first filter with the first time-domain estimate and configuring at least one tap of a second filter with the second time-domain estimate.

16. The method of claim 12, further comprising receiving the diversity time-domain signal in a tuner and generating a diversity combined signal via combination of the diversity time-domain signal with a third time-domain signal generated in the tuner from the RF signal received in the tuner from a third antenna.

17. An apparatus comprising:
a first tuner configured to receive a radio frequency (RF) signal from a first antenna, the first tuner including:
a RF front end circuit configured to condition the RF signal;
an analog-to-digital (ADC) converter configured to convert the conditioned RF signal to a digitized signal;
a digital front end circuit configured to generate a first time-domain quadrature signal from the digitized signal; and
a digital signal processor (DSP) coupled to the digital front end circuit, the DSP comprising:
a first path circuit configured to convert the first time-domain quadrature signal to a first frequency-domain signal and to differentially decode the first frequency-domain signal;
a second path circuit configured to convert a second time-domain quadrature signal to a second frequency-domain signal and to differentially decode the second frequency-domain signal, the second time-domain quadrature signal generated by a second tuner from the RF signal received from a second antenna;
a first combiner configured to combine the first and second decoded frequency-domain signals into a combined frequency-domain signal; and a re-encoder coupled to the first combiner configured to generate an estimated signal based on the combined frequency-domain signal, a first filter configured to filter the first time-domain quadrature signal based at least in part on the estimated signal, a second filter configured to filter the second time-domain quadrature signal based at least in part on the estimated signal, and a second combiner configured to combine the filtered first and second time-domain quadrature signals.

* * * * *